(12) United States Patent
Gonzalez et al.

(10) Patent No.: US 7,631,138 B2
(45) Date of Patent: Dec. 8, 2009

(54) ADAPTIVE MODE SWITCHING OF FLASH MEMORY ADDRESS MAPPING BASED ON HOST USAGE CHARACTERISTICS

(75) Inventors: Carlos J. Gonzalez, Los Gatos, CA (US); Mark Sompel, San Francisco, CA (US); Kevin M. Conley, San Jose, CA (US)

(73) Assignee: Sandisk Corporation, Milpitas, CA (US)

( * ) Notice: Subject to any disclaimer, the term of this patent is extended or adjusted under 35 U.S.C. 154(b) by 270 days.

(21) Appl. No.: 10/750,190

(22) Filed: Dec. 30, 2003

(65) Prior Publication Data

US 2005/0144361 A1    Jun. 30, 2005

(51) Int. Cl.
*G06F 12/00* (2006.01)
(52) U.S. Cl. .................... 711/103; 711/5; 711/100; 711/102; 711/150; 711/200; 711/202; 711/203; 365/230.01; 365/230.02; 365/230.03; 365/230.05; 365/189.04
(58) Field of Classification Search ......... 711/102–103, 711/5, 100, 150, 200, 202–203; 365/230.01–230.03, 365/230.05, 189.01, 189.04
See application file for complete search history.

(56) References Cited

U.S. PATENT DOCUMENTS

| | | | |
|---|---|---|---|
| 5,043,940 A | 8/1991 | Harari | |
| 5,070,032 A | 12/1991 | Yuan et al. | |
| 5,095,344 A | 3/1992 | Harari | |
| 5,172,338 A | 12/1992 | Mehrotra et al. | |
| 5,313,421 A | 5/1994 | Guterman et al. | |
| 5,315,541 A | 5/1994 | Harari et al. | |
| 5,341,330 A | 8/1994 | Wells et al. | |
| 5,341,489 A | 8/1994 | Heiberger et al. | |
| 5,343,063 A | 8/1994 | Yuan et al. | |
| 5,404,485 A | 4/1995 | Ban | |
| 5,457,658 A | 10/1995 | Niijima et al. | |
| 5,479,638 A | 12/1995 | Assar et al. | |
| 5,481,691 A | 1/1996 | Day, III et al. | |
| 5,485,595 A | 1/1996 | Assar et al. | |
| 5,541,886 A * | 7/1996 | Hasbun | 365/185.03 |
| 5,570,315 A | 10/1996 | Tanaka et al. | |

(Continued)

FOREIGN PATENT DOCUMENTS

EP    1 189 139 A1    3/2002

(Continued)

OTHER PUBLICATIONS

"International Preliminary Examination Report", European Patent Office, Corresponding Application PCT/US02/00366, Jul. 4, 2003, 7 pages.

(Continued)

*Primary Examiner*—Tuan V Thai
*Assistant Examiner*—Zhuo H Li
(74) *Attorney, Agent, or Firm*—Davis Wright Tremaine LLP (57) ABSTRACT

In a non-volatile memory storage system such as a flash EEPROM system, a controller switches the manner in which data sectors are mapped into blocks and metablocks of the memory in response to host programming and controller data consolidation patterns, in order to improve performance and reduce wear. Data are programmed into the memory with different degrees of parallelism.

5 Claims, 6 Drawing Sheets

U.S. PATENT DOCUMENTS

| | | | |
|---|---|---|---|
| 5,572,466 A * | 11/1996 | Sukegawa | 365/185.33 |
| 5,598,370 A | 1/1997 | Niijima et al. | |
| 5,648,929 A | 7/1997 | Miyamoto | |
| 5,649,200 A | 7/1997 | Leblang et al. | |
| 5,661,053 A | 8/1997 | Yuan | |
| 5,774,397 A | 6/1998 | Endoh et al. | |
| 5,798,968 A | 8/1998 | Lee et al. | |
| 5,835,935 A | 11/1998 | Estakhri et al. | |
| 5,838,614 A | 11/1998 | Estakhri et al. | |
| 5,845,313 A | 12/1998 | Estakhri et al. | |
| 5,860,090 A | 1/1999 | Clark | |
| 5,890,192 A | 3/1999 | Lee et al. | |
| 5,896,393 A | 4/1999 | Yard et al. | |
| 5,907,856 A | 5/1999 | Estakhri et al. | |
| 5,930,167 A | 7/1999 | Lee et al. | |
| 5,986,933 A | 11/1999 | Takeuchi et al. | |
| 5,987,563 A | 11/1999 | Itoh et al. | |
| 5,999,947 A | 12/1999 | Zollinger et al. | |
| 6,040,997 A | 3/2000 | Estakhri et al. | |
| 6,046,935 A | 4/2000 | Takeuchi et al. | |
| 6,115,785 A | 9/2000 | Estakhri et al. | |
| 6,122,195 A | 9/2000 | Estakhri et al. | |
| 6,125,435 A | 9/2000 | Estakhri et al. | |
| 6,134,151 A | 10/2000 | Estakhri et al. | |
| 6,151,247 A | 11/2000 | Estakhri et al. | |
| 6,161,163 A | 12/2000 | Komatsu et al. | |
| 6,219,768 B1 | 4/2001 | Hirabayashi et al. | |
| 6,222,762 B1 | 4/2001 | Guterman et al. | |
| 6,330,634 B1 | 12/2001 | Fuse et al. | |
| 6,426,893 B1 | 7/2002 | Conley et al. | |
| 6,449,625 B1 | 9/2002 | Wang | |
| 6,456,528 B1 | 9/2002 | Chen | |
| 6,507,885 B2 * | 1/2003 | Lakhani et al. | 711/5 |
| 6,522,580 B2 | 2/2003 | Chen et al. | |
| 6,567,307 B1 | 5/2003 | Estakhri | |
| 6,598,171 B1 * | 7/2003 | Farmwald et al. | 713/401 |
| 6,721,843 B1 * | 4/2004 | Estakhri | 711/103 |
| 6,763,424 B2 | 7/2004 | Conley | |
| 6,775,423 B2 | 8/2004 | Kulkarni et al. | |
| 6,871,259 B2 | 3/2005 | Hagiwara et al. | |
| 6,925,007 B2 | 8/2005 | Harari et al. | |
| 6,968,421 B2 | 11/2005 | Conley | |
| 2002/0034105 A1 | 3/2002 | Kulkarni et al. | |
| 2002/0099904 A1 | 7/2002 | Conley | |
| 2002/0194451 A1 | 12/2002 | Mukaida et al. | |
| 2003/0018847 A1 | 1/2003 | Katayama et al. | |
| 2003/0028704 A1 * | 2/2003 | Mukaida et al. | 711/5 |
| 2004/0030825 A1 * | 2/2004 | Otake et al. | 711/105 |
| 2005/0144358 A1 | 6/2005 | Conley et al. | |

FOREIGN PATENT DOCUMENTS

| | | |
|---|---|---|
| FR | 2742893 | 6/1997 |
| WO | WO 94/20906 | 9/1994 |
| WO | WO 94/22075 | 9/1994 |
| WO | WO 02/05285 A2 | 1/2002 |
| WO | WO02/05285 A2 | 1/2002 |
| WO | WO 02/49309 A2 | 6/2002 |
| WO | WO 02/058074 | 7/2002 |
| WO | WO 02/058074 A2 | 7/2002 |

OTHER PUBLICATIONS

Petro Estakhri et al., "Moving Sectors Within a Block of Information in a Flash Memory Mass Storage Architecture", U.S. Appl. No. 09/620,544, filed Jul. 21, 2000, 48 pages.

PCT International Search Report, European Patent Office, corresponding PCT Application No. PCT/US02/00366, Jul. 4, 2003, 5 pages.

"FTL Updates, PCMCIA Document No. 0165", Personal Computer Memory Card International Association, Version 022, Release 003, Mar. 4, 1996, pp. 1-26.

Mergi, Aryeh and Schneider, Robert, "M-Systems & SCM Flash Filing Software Flash Translation Layer-FTL", PCMCIA, Jul, 1994, 15 pages.

EPO/ISA, "Notification of Transmittal of the International Search Report and the Written Opinion of the International Searching Authority, or the Declaration", mailed in related PCT/US2004/042862 on Sep. 12, 2005, 19 pages.

European Patent Office, "Office Action," mailed in related European Patent Application No. 04 814 991.8 on Jun. 6, 2007, 2 pages.

USPTO, "Office Action," mailed in related U.S. Appl. No. 10/749,831 on Jun. 21, 2007, 15 pages.

Response to Office Action filed in related U. S. Appl. No. 10/749,831 on Oct. 29, 2007, 14 pages.

China State Intellectual Property Office, "First Office Action," corresponding related Chinese Patent Application No. 2004800416806 on Sep. 28, 2007, 18 pages.

Taiwan Intellectual Property Office, "Office Action of the IPO," corresponding related Taiwanese Patent Application No. 093140967 on Nov. 13, 2007, 5 pages.

China State Intellectual Property Office, "Second Office Action," corresponding Chinese Patent Application No. 200480041680.6, mailed on Jun. 5, 2009, 13 pages (including translation.).

* cited by examiner

ADAPTIVE MODE SWITCHING OF FLASH MEMORY ADDRESS MAPPING BASED ON HOST USAGE CHARACTERISTICS

FIELD OF THE INVENTION

This invention pertains to the operation of non-volatile flash memories, and, more specifically, to the management of very large memory cell blocks.

BACKGROUND

There are many commercially successful non-volatile memory products being used today, particularly in the form of small form factor cards, which employ an array of flash EEPROM (Electrically Erasable and Programmable Read Only Memory) cells formed on one or more integrated circuit chips. A memory controller, usually but not necessarily on a separate integrated circuit chip, interfaces with a host to which the card is connected and controls operation of the memory array within the card. Such a controller typically includes a microprocessor, some non-volatile read-only-memory (ROM), a volatile random-access-memory (RAM) and one or more special circuits such as one that calculates an error-correction-code (ECC) from data as they pass through the controller during the programming and reading of data. Some of the commercially available cards are Compact-Flash™ (CF) cards, MultiMedia cards (MMC), Secure Digital (SD) cards, Smart Media cards, personnel tags (P-Tag), and Memory Stick cards. Besides the memory card implementation, this type of memory system can alternatively be embedded into various types of host systems.

Two general memory cell array architectures have found commercial application, NOR and NAND. In a typical NOR array, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells. Examples of such cells, their uses in memory systems and methods of manufacturing them are given in U.S. Pat. Nos. 5,070,032, 5,095,344, 5,313,421, 5,315,541, 5,343,063, 5,661,053 and 6,222,762.

The NAND array utilizes series strings of more than two memory cells, such as 16 or 32, connected along with one or more select transistors between individual bit lines and a reference potential to form columns of cells. Word lines extend across cells within a large number of these columns. An individual cell within a column is read and verified during programming by causing the remaining cells in the string to be turned on hard so that the current flowing through a string is dependent upon the level of charge stored in the addressed cell. Examples of NAND architecture arrays and their operation as part of a memory system are found in U.S. Pat. Nos. 5,570,315, 5,774,397, 6,046,935, and 6,522,580.

The charge storage elements of current flash EEPROM arrays, as discussed in the foregoing referenced patents and are most commonly electrically conductive floating gates, typically formed from conductively doped polysilicon material. An alternate type of memory cell useful in flash EEPROM systems utilizes a non-conductive dielectric material in place of the conductive floating gate to store charge in a non-volatile manner. A triple layer dielectric formed of silicon oxide, silicon nitride and silicon oxide (ONO) is sandwiched between a conductive control gate and a surface of a semi-conductive substrate above the memory cell channel. The cell is programmed by injecting electrons from the cell channel into the nitride, where they are trapped and stored in a limited region, and erased by injecting hot holes into the nitride. Several specific cell structures and arrays employing dielectric storage elements and are described in U.S. patent application Ser. No. 10/280,352, filed Oct. 25, 2002 (publication no. 2003/0109093 A1).

As in most all integrated circuit applications, the pressure to shrink the silicon substrate area required to implement some integrated circuit function also exists with flash EEPROM memory cell arrays. It is continually desired to increase the amount of digital data that can be stored in a given area of a silicon substrate, in order to increase the storage capacity of a given size memory card and other types of packages, or to both increase capacity and decrease size. One way to increase the storage density of data is to store more than one bit of data per memory cell and/or per storage element. This is accomplished by dividing a window of a storage element charge level voltage range into more than two states. The use of four such states allows each cell to store two bits of data, eight states stores three bits of data per storage element, and so on. Multiple state flash EEPROM structures using floating gates and their operation are described in U.S. Pat. Nos. 5,043,940 and 5,172,338, and for structures using dielectric floating gates in aforementioned U.S. application Ser. No. 10/280,352 (publication no. 2003/0109093 A1). Selected portions of a multi-state memory cell array may also be operated in two states (binary) for various reasons, in a manner described in U.S. Pat. Nos. 5,930,167 and 6,456,528.

Memory cells of a typical flash EEPROM array are divided into discrete blocks of cells that are erased together. That is, the block is the erase unit, a minimum number of cells that are simultaneously erasable. Each block typically stores one or more pages of data, the page being the minimum unit of programming and reading, although more than one page may be programmed or read in a single operation. Each page typically stores one or more sectors of data, the size of the sector being defined by the host system. An example sector includes 512 bytes of user data, following a standard established with magnetic disk drives, plus some number of bytes of overhead information about the user data and/or the block in which they are stored. Memory systems are typically configured with 16, 32 or more pages within each block, and each page stores one or just a few host sectors of data.

In order to increase the degree of parallelism during programming user data into the memory array and read user data from it, the array is typically divided into sub-arrays, commonly referred to as planes, which contain their own data registers and other circuits to allow parallel operation such that sectors of data may be programmed to or read from each of the planes simultaneously. An array on a single integrated circuit may be physically divided into planes, or each plane may be formed from a separate one or more integrated circuit chips. Examples of such a memory system are described in U.S. Pat. Nos. 5,798,968 and 5,890,192.

To further efficiently manage the memory, blocks may be linked together as metablocks; that is, each logically addressable metablock is defined to include one physical block from each plane. Use of the metablock is described in international patent application publication no. WO 02/058074. The metablock is identified by a common logical address as a destination for programming and reading data. Similarly, all blocks of a metablock are erased together. The controller in a memory system operated with such large blocks and/or metablocks performs a number of functions including the translation between logical block addresses (LBAs) received from a host, and physical block numbers (PBNs) and page addresses within the memory cell array. This translation often involves use of intermediate terms of a logical block number (LBN) and logical page.

The memory system controller is preferably able, by its structure and controlling firmware, to cause data to be programmed and read under a variety of conditions imposed upon it by the host. As one example, audio, video or other streaming data can be received at a high rate of speed, and the memory system is called upon to store the data in real time. As another example, the host may cause the memory system to program or read one sector of data at a time, such as occurs when writing or updating a file allocation table (FAT) stored in the array.

Data stored in a metablock are often updated, the likelihood of updates increasing as the data capacity of the metablock increases. Updated sectors of one metablock are normally written to another metablock. The unchanged sectors are usually also copied from the original to the new metablock, as part of the same programming operation, to consolidate the data. Alternatively, the unchanged data may remain in the original metablock until later consolidation with the updated data into a single metablock again.

SUMMARY OF THE INVENTION

According to the present invention, the size of the memory unit in which data are programmed is adapted to the character and amount of the data being programmed by the host. When the advantages of a high degree of parallelism offered by writing data to a metablock are outweighed by the disadvantages of increasing instances of data consolidation that occur in specific circumstances, the data sectors are written to a fewer number of blocks than are logically linked together in a metablock, such as being programmed sequentially within one or more blocks in a single plane.

Sectors of data are written in parallel to all blocks of a metablock, when the number of data sectors being programmed relative to the capacity of the metablock make the advantages of a high degree of parallelism worthwhile. However, when a particular data programming operation involves only a small number of data sectors relative to the storage capacity of the metablock, resulting increased data consolidation operations can hurt performance more than the higher parallelism will help, in which case the advantages of parallelism provided by the use of metablocks are not realized.

According to a specific aspect of the present invention, the memory controller adaptively programs a number of sectors of data either with a high degree of parallelism into a metablock or with a low degree of parallelism into a fewer number of blocks than make up a metablock, depending upon the number of sectors included in the host write command and/or in a series of write commands. Data may be programmed into a full metablock of M physical blocks, where M equals 4, 8 or the some other integer, or into a unit of a lesser number of blocks such as M/2, M/4, M/8, or the like, depending upon host data programming patterns for logical blocks that are mapped into such physical blocks. In a particular type of host programming operation, the programming of single sectors of data, which often occurs in normal operation as the host updates operational files such as the FAT table, are directed to a single block rather than to a metablock or sub-metablock. A metablock is not used for programming one sector at a time. Nor is a metablock likely to be used for a programming operation of only a few sectors with logically sequential addresses that would be spread out over the several blocks of the metablock by parallel programming, thereby to result in only one or a few data sectors written to each block of the metablock at one time. A single block is preferably used in such a case. This avoids having to consolidate data from all the several blocks of the metablock into new blocks and the original blocks then erased each time such a few sectors of the metablock are updated. Such data consolidation with a single block results in only a single block erasure, resulting in a fewer number of programming and erase cycles (wear) of the memory that can shorten its useful life.

According to another specific aspect of the present invention, access to data stored with a one degree of parallelism is converted for access with another degree of parallelism when this will likely provide more optimal performance characteristics. For example, parallel programming to a metablock may be converted to sequential programming to blocks in a single plane when data writes to the metablock have changed such that this would improve performance. Such a conversion includes copying data from blocks of the metablock to other blocks in a single plane. Conversely, sequential programming to blocks in a single plane can be converted to parallel programming within a metablock to improve performance, including copying data from the original blocks into the metablock.

In an exemplary implementation, a mode bit may be stored in the flash memory array and associated with individual sector user data to designate whether the sector has been programmed with others in parallel in a metablock or rather was programmed in logical sequence with others in a single block. The mode bit can be stored with user data of a sector or, alternatively, as part of another sector that contains overhead data for many user data sectors. By reading this bit when commanded by the host to either read or re-program the user data of a sector, the controller accesses the sector in the proper mode. During initial operation, the controller functions in the parallel mode but will change to the sequential mode in response to host programming commands that designate a sequence of one or a few sector write operations. The controller then changes the mode bit associated with the affected data sectors and programs the user data in sequence. Operation of the controller can be switched back to the parallel programming mode when one or more programming commands are received from the host that designate a number of sectors of data to be programmed together in excess of a threshold number of sectors.

Further, in a specific implementation, each metablock is formed of one block from each of several or all of the planes of the memory array. User data are then programmed and read in one of two primary modes. In a first primary mode, a number of consecutively addressed data sectors are programmed in parallel across multiple blocks of the metablock. This results in data sectors being stored out of sequence in the individual blocks. They are interleaved across the planes in which the metablock is formed. In a second primary mode, data sectors are written in sequence within the individual blocks of the metablock. The controller also responds to a change in data sectors between parallel and sequential programming to re-designate an order of the physical addresses between extending either across the planes (first mode) or sequentially within a single plane (second mode). This can include moving data between blocks. A memory system typically operates with different blocks in different ones of these two modes in order to increase performance of the memory system.

Additional aspects, advantages and features of the present invention are included in the following description of exemplary examples thereof, which description should be taken in conjunction with the accompanying drawings. All patents, patent applications, articles and other publications referenced herein are hereby incorporated herein by this reference in their entirety for all purposes.

DETAILED DESCRIPTION OF EXEMPLARY EMBODIMENTS

Figure 1:
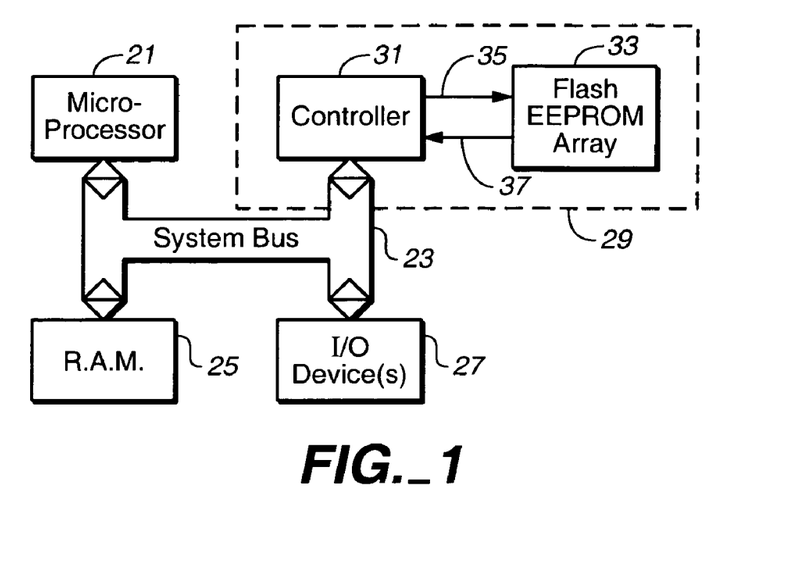
FIG. 1 generally shows a non-volatile memory system and its use with a host system.

FIG. 1 generally shows an electronic system, such as a computer system, that includes a flash memory system in which various aspects of the present invention may be incorporated. Some examples of this electronic system include desktop computers, laptop computers, handheld computers, palmtop computers, personal digital assistants (PDAs), MP3 and other audio players, digital cameras, video cameras, electronic game machines, wireless and wired telephony devices, answering machines, voice recorders, network routers and others.

This electronic system of FIG. 1 includes a processor or microprocessor 21 connected to a system bus 23, along with random access, main system memory 25, and at least one or more input-output devices 27, such as a keyboard, monitor, modem, and the like. Another main computer system component that is connected to a typical computer system bus 23 is an amount of long-term, non-volatile memory. In contrast to volatile memory such as DRAM (dynamic RAM) or SRAM (static RAM), nonvolatile memory retains its stored state even after power is removed from the device. Typically, such a memory is a disk drive using magnetic or optical technology with a capacity of megabytes, gigabytes, or terabytes of data storage. This data is retrieved into the system volatile memory 25 for use in current processing, and can be easily supplemented, changed, or altered.

In the case of FIG. 1, the bulk storage memory is a non-volatile flash memory system 29. The memory 29 may be in the form of a removable memory card or may be permanently wired into (embedded in) the computer system. The memory system 29 includes a controller 31, connected to the computer system bus 23, and a memory cell array 33 formed of one or a plurality of integrated circuit chips. Data and instructions are communicated from the controller 31 to the memory cell array 33 primarily over lines 35. Similarly, data and status signals are communicated from the memory cell array 33 to the controller 31 over lines 37. Data lines 35 and 37 may be serial or parallel, depending on the implementation. Other control and status circuits between the controller 31 and the array 33 are not shown in FIG. 1. In some systems, the controller 31 is embedded within the computer system and the memory cell array 33 is packaged in a removable card.

The array 33 may be operated in a manner that each charge storage element or area stores one bit of data. Alternatively, the array 33 may be operated with more than one bit of data being stored in each memory cell charge storage element or area, referred to as multi-state or multi-level cells.

Figure 2:
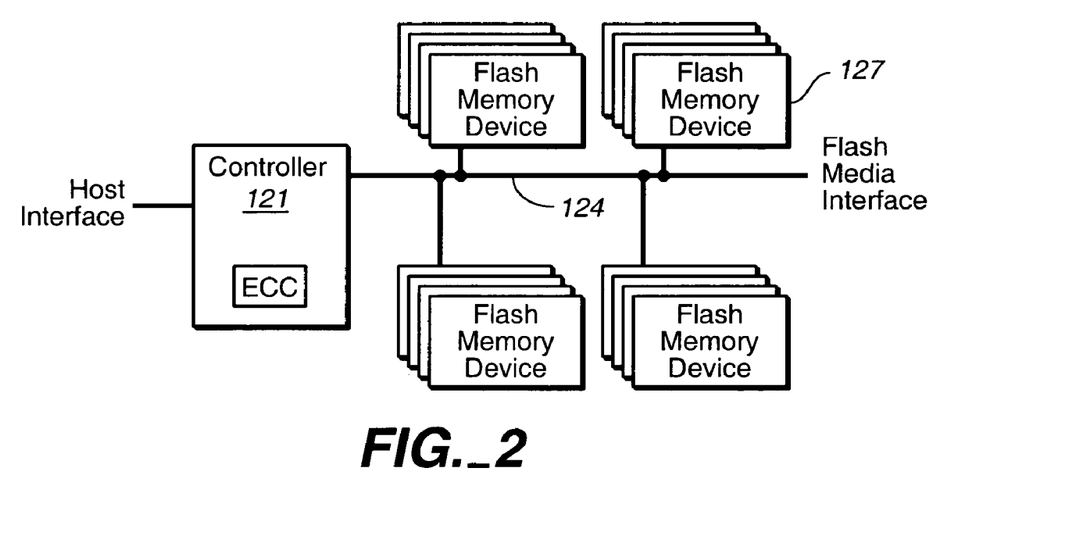
FIG. 2 illustrates an example architecture of the memory system of FIG. 1.

FIG. 2 shows an example memory card architecture that includes a single controller integrated circuit chip 121 that performs host interface and memory control functions, and a flash memory cell array made up of a plurality of integrated circuit chips 127. The system controller and memory cell array chips are connected by a bus 124 that allows commands, addresses and data to be transferred between the controller 121 and the memory chips 127. It should be noted that while this is typical, some memory systems do not have a dedicated controller, but instead rely on direct control by the host system.

It is common practice that each sector's worth of host data programmed into a sector is appended with an error detection and correction code (ECC) that is used to determine the validity of the stored data. Some such systems then check the validity of the data being read by using the ECC as a way to ensure that the data has not been corrupted. Sectors of user data may also be stored along with the ECC and other overhead data in the form of a header.

One characteristic of accessing the memory array to program or read sequentially addressed data is a "degree of parallelism". That is, it is usually preferable to program and read as much data as practical in parallel in order to improve the memory system performance, i.e. the rate at which data is transferred to and from the array. The term "degree of parallelism" is used herein to refer to the number of pages of the memory that may be programmed or read in parallel. In by-one mode, only a single page is accessed at one time. In a by-four mode, a plurality of consecutively addressed host sectors are accessed in up to four pages at a time. To improve performance and endurance under some host data access patterns, there is a need to organize the mapping to allow for a greater degree of parallelism, while under other host data access patterns, there is a need to organize the mapping for lower a degree of parallelism. It is possible for the host to access data in different portions of a memory system with different patterns, leading to the need to organize the mapping differently for different portions of the memory system. It is also possible that the host data access patterns to data stored in a particular address range of the storage device change over time, leading to the need to modify the mapping organization of a particular address range over time. The general need is for a memory management that optimizes memory utilization under the various host usage patterns that it is likely to experience.

Figure 3:
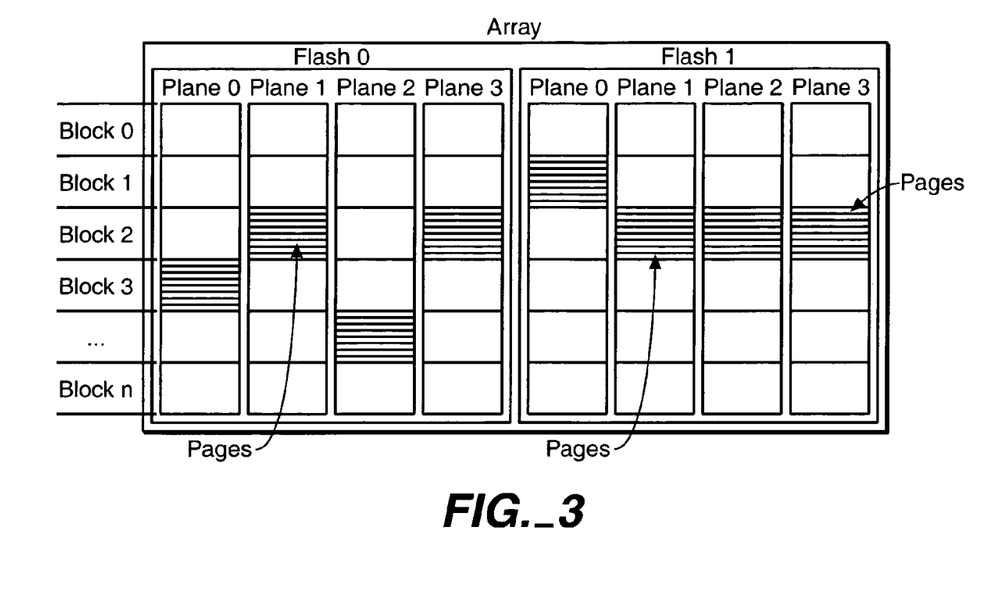
FIG. 3 illustrates a particular organization of the memory cell array of the memory system of FIGS. 1 and 2.

FIG. 3 shows an example of the memory cell array of FIGS. 1 and 2. In this example, the array includes two integrated circuit devices Flash 0 and Flash 1. Of course, one or more than three devices can be used depending on the desired storage capacity of the memory system. The portion of the array in each device is divided into four planes 0-3, although 2, 3 or more than 4 planes may be used in other embodiments. A plurality of Q pages (a page is the minimum unit of programming and reading) are included within each block of memory cells (the minimum unit of erase), and a plurality of N blocks are included within each plane. A page has the capacity to store one or a plurality of host sectors of data, so that each block stores M data sectors that can be a multiple of the Q pages in each block. Each plane has its own circuitry that accesses the memory blocks and pages within the plane. Generally, only one page is written or read in each plane simultaneously. In a specific embodiment, each sector includes 512 bytes of user data. Each sector may also include additional bits or bytes for flags, user data ECC, various parameters and other overhead data.

The number of planes governs the possible degrees of parallelism with which the memory system may be operated. The degree of parallelism represents the number of pages that may be programmed or read at the same time. With greater degrees of parallelism, more data may be operated on at the same time. The degree of parallelism may be 1, 2 or more. With a high degree of parallelism, the logical-to-physical address conversions are made by the controller to cause multiple pages in multiple planes to be accessed at once. A number of sectors of data with consecutive logical addresses are accessed at the same time. This number of sectors is equal to the number of pages being accessed in parallel times the number of sectors stored in each page. For the case where the degree of parallelism is one, this is referred to herein as the by-one mode. With this lowest degree of parallelism, only one page of one plane is accessed at one time. In this case, a number of host data sectors with consecutive logical addresses that may be stored in a single page can be accessed at one time.

The controller can determine the degree of parallelism with which data are to be programmed into the memory by the number of data sectors having sequential logical addresses that are specified in a write command from the host. Some host commands specify a large number of sequential data sectors to be programmed in a single command. The controller responds to this type of command by writing the data into the memory with a higher amount of parallelism, an example shown in FIG. 4. Other host commands specify only one or a very few data sectors with consecutive logical addresses to be written, and this command is executed with a minimum degree of parallelism, an example shown in FIG. 5.

In the particular memory implementation being described, multiple data sectors may be simultaneously programmed into multiple physical pages, one in each plane, for a maximum degree of parallelism. This permits higher performance writing of data. In particular, for four planes, up to four pages may be written at the same time, so that the memory operates up to about four times faster than a memory where data can only be written one sector at a time. The number of separate programming operations required to program that amount of data is significantly reduced. As a further example, for a memory having eight planes, the programming of this memory with the highest parallelism is up to about eight times faster than a memory where data can only be programmed into one page at a time.

In a multi-plane memory organization, a block from each plane may be logically grouped together to form a metablock. A combination of the eight blocks of FIG. 3 that include lines showing their pages is an example of a metablock. The metablock is a logical grouping of blocks containing the data of sectors in some range of consecutive host addresses. A sub-metablock is a subset of blocks within a metablock that are managed as a set or unit. Once a metablock is partitioned into sub-metablocks, for data management purposes, each sub-metablock is essentially managed like a metablock having reduced parallelism in that data within it are consolidated by themselves, independent of other portions of the metablock. In FIG. 3, for example, four blocks on each of the devices may form a metablock or sub-metablock rather than extending the metablock across both devices.

The following discussion uses the following terminology: (1) an original block is a metablock or sub-metablock containing some original set of data; (2) an update block is a metablock or sub-metablock containing an updated version of some data from an original block, or some data copied from an original block, or both; and (3) a logical block or sub-metablock is the set of host logical sectors mapped to a physical metablock or sub-metablock, regardless of the physical location of the blocks, or of whether the data is contained in a single location, or in an original block and an update block.

A logical metablock is an intermediate unit that lies between the physical set of blocks that form a metablock at any given time and the logical construct that is managed by the host to contain some range of data, regardless of the physical blocks in which the data reside at any given time. Additionally, a metablock may be mapped across several memory circuit chips such that if the memory cell array on a circuit chip contains N planes, the metablock contains up to 2N blocks, if across two chips, or more if mapped across more chips.

Figure 6:
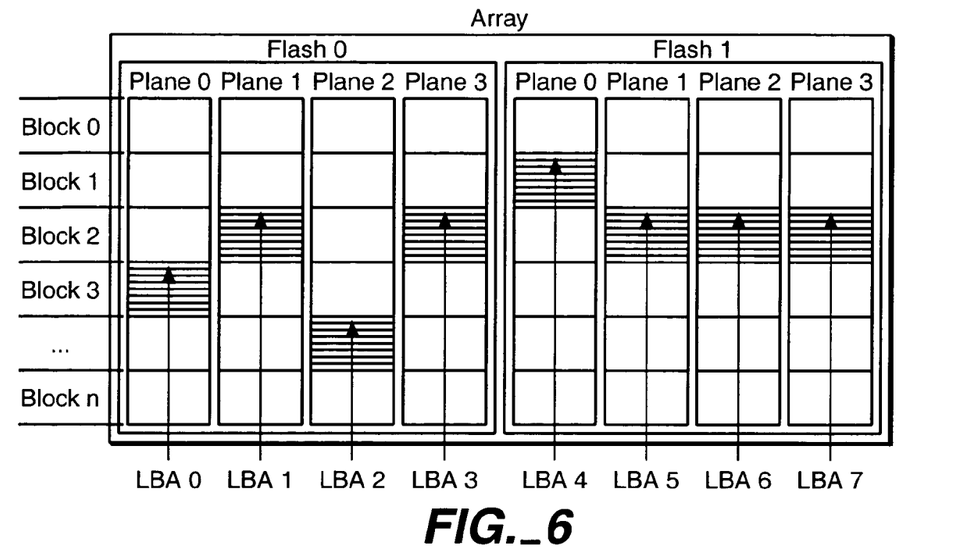
FIG. 6 illustrates one example of mapping logical block addresses to physical blocks of the memory cell array of FIG. 7.

Data with a given logical block address (LBA) is mapped by the controller into a specific physical memory block within that plane that is identified by a physical block number (PBN). The PBNs of the blocks making up a metablock do not have to be the same. FIG. 6 shows an example metablock formed from several blocks having different physical locations within each of their planes. Further, as the blocks making up a metablock or portions of the metablock are changed during the course of the memory system operation, the relative positions of the blocks within each plane need not remain fixed, but may be relocated within each plane independently of each other.

Figure 7:
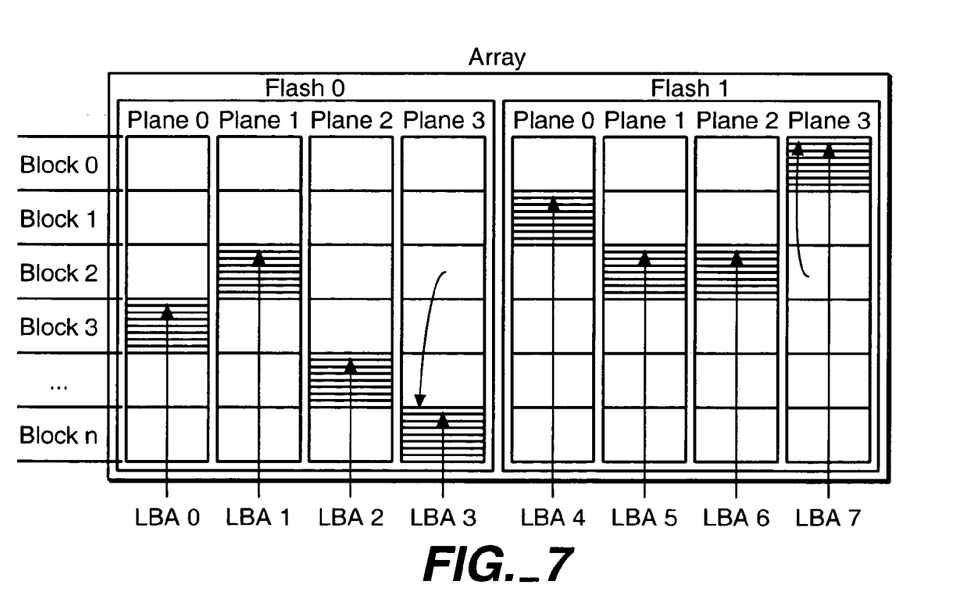
FIG. 7 illustrates another example of mapping logical block addresses to physical blocks of the memory cell array of FIG. 7.

When a sector is updated with new data, the block associated with the given sector is copied to a new block within the plane. The block may be located anywhere within the plane. FIG. 7 shows an example pertaining to a sub-metablock being moved to some other arbitrarily physical blocks.

Metablocks that are configured for maximum parallelism are best suited for host commands that access multiple data sectors having sequential logical addresses. A high level of performance is achieved when the number of sectors per host read or write command matches or exceeds the number of sectors that may be accessed in parallel. Incremental gains are achieved with host commands that operate on larger and larger numbers of sector commands at a time since this reduces the amount of processing overhead per sector associated with issuing individual commands.

A drawback of operating the memory with metablocks is manifested when the host writes only one sector per plane, and then writes elsewhere in the array, because of requiring data within the partially updated metablock to be consolidated. This consolidation entails copying all of the unchanged data sectors from the original metablock into the new metablock in which the updated data are programmed, and thereafter erasure of all blocks in the original metablock. In the case of a memory array with 8 planes, 64 pages per block and 1 data sector stored in each page, the copying of 504 sectors and the erasure of 8 blocks are required. Conversely, if the new sectors of data are written to a sub-metablock that is operated with a parallelism of one, then the consolidation entails 56 sector copies and a single block erasure, a much reduced overhead caused by updating a few sectors of data.

Short, non-sequential writes will accelerate memory wear as the erasures associated with consolidation and moving of data wears out the memory. Each memory block has a finite number of erase and program cycles that it can endure before ceasing to operate properly. The maximum number of cycles depends upon the structure of the memory array and the precision with which the memory storage states must be maintained, among other factors. This number may be as low as 10,000 cycles or may be quite large, such as 100,000 cycles or more, but it is important to maintain the operability of all blocks in the memory system. To minimize wear, block erasures are preferably minimized.

The following are various scenarios under which a metablock, sub-metablock, or portion of either are relocated and/or data are consolidated:

(1) When the host rewrites one or more sectors of data within the block. At such a time, the system allocates an erased block to be an update block, and the rewritten data are written to the update block. It often occurs that some or all of the unchanged data within the original block are also copied over to the update block, and the logical-to-physical address conversion maintained in the system is updated to thereafter address the new block in response to receiving a request for data at the same logical address. The original block is then erased if all the data stored in it have been superceded by programming the update block through data copy or data re-write by the host.

(2) If an erased block is needed for allocation as an update block, but no pre-erased blocks are available, particularly in the planes in which the original block resides, then data within two or more other blocks are consolidated in one or more other blocks. One or more blocks from which all their data are moved are then erased and become available for use as the update block of the current programming operation.

(3) In one embodiment, the system may consolidate only portions of a metablock, in the plane(s) needed to provide an update block. The blocks of the metablock within the remaining planes can be consolidated later upon demand, as update blocks in the remaining planes are needed.

(4) In yet another alternate embodiment, a metablock that has been consolidated in some planes but not others is written to by the host, and requires erased blocks in those planes that were consolidated. There is no need to fully consolidate (garbage collect) the data in any given metablock, but instead, the blocks within each plane are managed independently to allow on-demand consolidation and allocation of blocks. In this manner, sub-metablocks may be moved to new physical addresses during system operation, independent of other portions of a given metablock.

Figure 4:
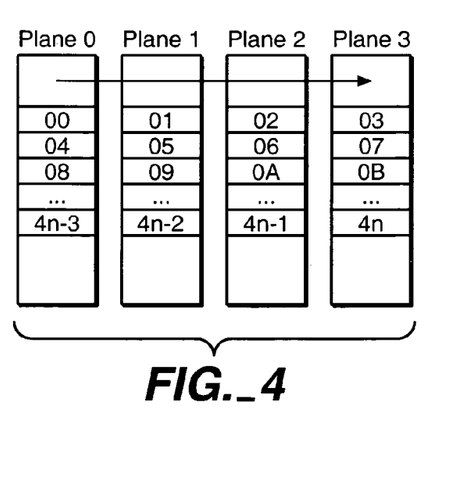
FIG. 4 shows a first example sequence of blocks of the memory cell array of FIG. 7.

When storing data, the controller may further organize writing into the memory by mapping the data sectors into the physical blocks in a way that permits high-speed operation. FIG. 4 shows interleaving of the memory across planes 0-3 in a manner that permits maximum parallelism in access, in this example 4×parallel interleaving. Parallel interleaving refers to the memory being formatted such that sequentially addressed host sectors are interleaved between planes; that is, multiple sequentially addressed data sectors are simultaneously programmed in parallel in pages of different planes. Data are simultaneously programmed to one block of each plane making up a metablock before data are programmed into the next series of blocks that form another metablock. Assuming for the example of FIG. 4 that only one data sector is stored in the individual pages of the blocks, the controller writes a first sector, sector 0, into a block in plane 0, a second sector, sector 1, into a block in plane 1, a third sector, sector 2, into a block in plane 2, and a fourth sector, sector 3, into a block plane 3. This organization of the memory may be referred to as parallel mapping. In this case, this is a "by four" or "×4" or "4×" interleaving. By organizing the writing of the data into this format, this allows consecutively addressed incoming data from a host, usually a stream of bits, to be written in a high-speed way because four sectors in four different planes are programmed at a time.

In a specific implementation, the incoming data are serially received by a buffer associated with each plane, which may be a register, and the data are written in parallel from the register(s) into the non-volatile memory cells according to the how the controller has interleaved the memory. A particular interleaving of the memory cells may be obtained by formatting the memory accordingly. Data may be retrieved from the memory according to the same interleaving format in which it is written.

There are many different ways to map a memory, including other degrees of parallel interleaving. There may be more planes than the degree of parallel interleaving. For example, even though there are four planes, the parallel interleaving for a particular programming operation may only allow two planes to be simultaneously accessed. This may be referred to as "by two" or "×2" or "2×" interleaving. The memory may also be operated with "by three" or "×3" or "3×" interleaving.

Figure 5:
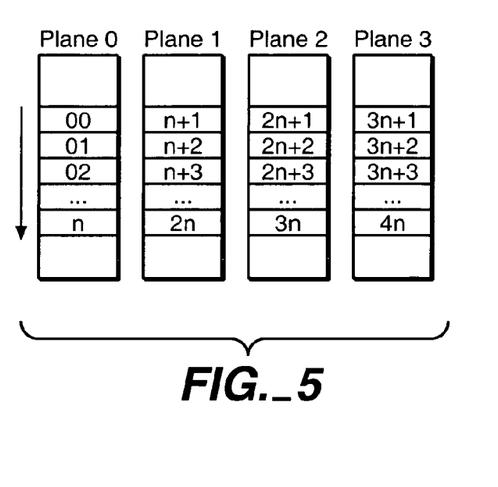
FIG. 5 shows a second example sequence of blocks of the memory cell array of FIG. 7.

FIG. 5 shows a by-one interleaving of the memory. The degree of parallelism is one. Sometimes this is referred to as no parallelism since accesses are by a single page in one plane at a time. In FIG. 5, sectors are written to one block in sequence until all the pages of that block are filled, and then writing proceeds to another block. This may be referred to as "by one" or "×1" interleaving.

A timing example illustrates the performance difference between the interleaving of FIGS. 4 and 5. To write four consecutive sectors according to FIG. 5, a data register of a single plane is filled four times in sequence, and the write is performed four times in sequence. If the register load takes 25 microseconds and the write takes 1 millisecond, the total time would be: 4*25 microseconds+4*1000 microseconds=4100 microseconds. But with the parallel writing of FIG. 4, a four-sector write still involves four data register loads in sequence but only one write operation. The total time would be: 4*25 microseconds+1000 microseconds=1100 microseconds. This 4×parallel mapping results in a 3.7 times increase in performance over the 1× mapping. Since different memories have different timing characteristics, these specific numbers are being used only to provide a comparative example.

There may be an interleaving indicator bit or bits stored in the controller or in the memory to let the controller know how the data sectors have been stored. Using the interleaving indicator bit or bits, the controller can determine the sequence in which to store update data or to read the data. For example, each sector on the memory may have one or more indicator bits included to indicate how the sector was stored. For a four-plane memory, there are 7 possible memory interleaving configurations. These interleaving indicator bits are in addition to the user data bits and other overhead bits such as ECC. The indicator bits may alternatively be stored separately in tables rather than in headers.

A single memory array will most commonly have blocks that are accessed with different interleaving. For example, the same memory may have some data stored by-one (FIG. 5) and other data stored by-four (FIG. 4). The sector interleaving indicator bits indicate the interleaving with which sectors have been stored in one or more blocks. For example, a first data file may be stored in the memory using by-one interleaving, and the indicator bits for the sectors stored in the first sub-metablock indicate this. A second data file may be stored in a sub-metablock by using by-two interleaving, and the indicator bits for the sectors so stored indicates this. A third data file may be stored in a sub-metablock by using by-three interleaving in the same manner. In a single memory array, various of the memory cell blocks may be organized in several of these ways.

The controller decides how to direct data from the nature of the host programming commands. For example, if the host is updating a FAT file system (an MS-DOS file format), each data write command will generally specify a single sector. That is, only one sector is programmed to the flash memory in response to each host write command. In this case, the data may be stored sequentially in a single block of memory, a by-one operation, rather than in a metablock. In another type of data programming operation, where a very large file is being programmed, the host write command specifies a very large number of data sectors to be written in sequence of logical addresses that can occupy a significant portion or all of at least one metablock. The controller responds to the host activity to match the degree of parallelism to the nature of the data writes.

In addition to responding to individual data write commands in deciding how to map logical addresses to physical addresses, the controller may monitor patterns of host write commands. This monitoring can include maintaining a count of the number of times a particular block or blocks have been accessed by the host. This information may be stored as overhead data within the data sectors stored in those blocks, or in separate physical blocks. The analysis of the stored number or numbers may include comparing with a threshold number, or comparing the difference of the frequency of two or more access usage patterns with a threshold number. This information is useful, for example, to identify a metablock where data are frequently re-written, in which case the controller can decide to map future writes with the same logical addresses to a single block instead. This reduces the amount of data that must be consolidated as a result of the data update.

Another programming characteristic that may be monitored and stored by the controller is the number of times one or more pages or blocks have been written due to host commanded writes versus those due to data consolidation (garbage collection) initiated by the controller. Yet another is the number of times less than all the pages of a block or metablock have been accessed for data writing, as repeated partial access of a block or metablock can signal the desirability of lowering the degree of parallelism with which data are written into such a block. Further, statistics of the number of sectors written by individual host programming commands can be maintained and used in deciding the mapping of logical addresses to physical addresses. For example, whether the host write commands are predominately specifying one, four or more sectors of data to be written at a time can be very useful.

Although the illustrations of FIGS. 4 and 5 show essentially an entire integrated circuit device being operated with one of two interleaving schemes for purposes of explaining the concepts, this is usually not be an efficient way to use the memory. Each device will normally be operated with a portion of its blocks used to form metablocks for parallel access (per FIG. 4) and others of its blocks being accessed one at a time (per FIG. 5).

There are certain advantages and disadvantages to how sector addresses are interleaved across planes. An advantage of higher degrees of parallel interleaving is that sequentially addressed sectors may be written to a memory in parallel. An advantage of a lower degree of parallel mapping or sequential mapping is that it requires less data be copied in response to partial block updates, and particularly that fewer blocks need to be garbage collected when a small number of data sectors are rewritten. When a portion of the data stored in a metablock is rewritten, the data residing in the original block that has not been rewritten is copied to a new block and it is stored with the new data. If the data was stored using parallel mapping, an entire metablock would need to be rewritten because data is spread across different planes. However, if the data were stored in a sub-metablock using sequential mapping, then if data in only the sub-metablock need be garbage collected. The data to be rewritten along with any data that has not been rewritten are written into a new block, and the new block is linked up with the other blocks of the metablock. This would minimize the amount of copying, writing, rewriting, and garbage collection that needs to be done.

Typically, flash memory cells have a finite number of erase and write cycles (e.g., somewhere between 10,000 and 100,000 cycles) before their reliability is potentially reduced to an unacceptable level. Therefore, by minimizing the amount of rewriting and writing, this increases the longevity of the memory. Reducing the amount of garbage collection also improves performance because garbage collection takes time.

The following implementation is a specific embodiment of the invention using Flash memory. However, Flash memory is used merely as an example and the invention may be used with other memory technologies. In a specific embodiment, the invention deals with storage devices including Flash memory devices that contain multiple sector "blocks." A block is defined as the amount of memory that is erased by one erase operation. In other words, a block is a unit of erase. The invention specifically addresses the mechanism used for the mapping and accessing of those blocks.

When host devices access Flash memory cards, there are several characteristic usage patterns. A FAT file system leads to two distinct patterns: (1) single-sector in the FAT and directory areas, and (2) multiple-sector in the user data area of the storage device. If there is fragmentation in the volume, and for certain applications, the usage will further be "random" rather than sequential.

A host may access the Flash memory via various host usage patterns. One usage pattern is a single sector mode, in which sectors are accessed, one at a time. The other usage pattern is multiple-sector in which case the storage system accesses one sector per plane simultaneously across multiple planes in each Flash device.

This invention matches degrees of parallelism between host usage patterns of a nonvolatile memory and how the nonvolatile memory is organized or formatted. The degrees of parallelism may be by one (also referred to as sequential), by two, by three, by four, and so forth. The by-one or sequential access method addresses each sector in a block before going on to the next block, and that access is limited to one sector at a time. The parallel access method (greater than by-one access) addresses sectors from each plane in one operation, instead of several sequential or by-one operations. The parallel operation allows for higher performance by increasing throughput. These two methods have advantages and disadvantages with respect to performance and wear.

This invention monitors the host accesses and will switch the way data is stored in the memory to take advantage of the memory wear and performance characteristics of either access mode.

There are various methods of maintaining mapping information, and a table of starting LBAs is one example. A table that is kept in memory is used to locate the starting LBAs for each physical memory block.

Adaptive parallelism of block mapping, which entails sector mapping and block management, provides the best write and erase wear performance for the Flash memories by only performing copy or erase operations, or both, on blocks that contain sectors that are being overwritten with new data.

Accesses to areas into which data sectors are being mapped for single-sector parallelism are limited to writing sequentially addressed sectors one at a time in order to maintain sequential address ordering within a given logical block. Parallel access (greater than by-one access) allows one sector per plane to be written simultaneously, improving performance by a factor equal to the number of planes written in parallel. For instance, a device with four planes may write data approximately four times faster than single sector writes. A device with eight planes may write data approximately eight times faster than single sector writes. A device with sixteen planes may write data approximately sixteen times faster than single sector writes.

Figure 8:
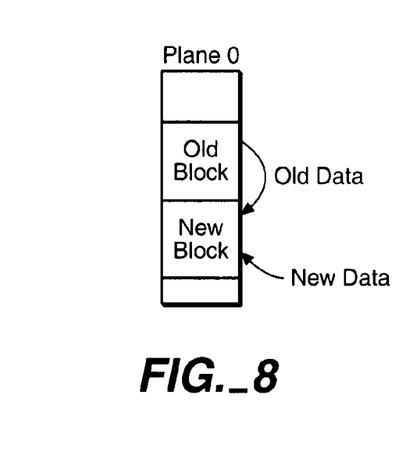
FIG. 8 shows a first example of modification of data within the memory cell array of FIG. 7.

FIG. 8 shows modification of data when using sequential mapping. To overwrite four consecutive sectors would require that the new data be written to a new block, and the old data copied to the new block, and the old block erased. Only one erasure would need to occur. The copy processes do not copy erased sectors.

Figure 9:
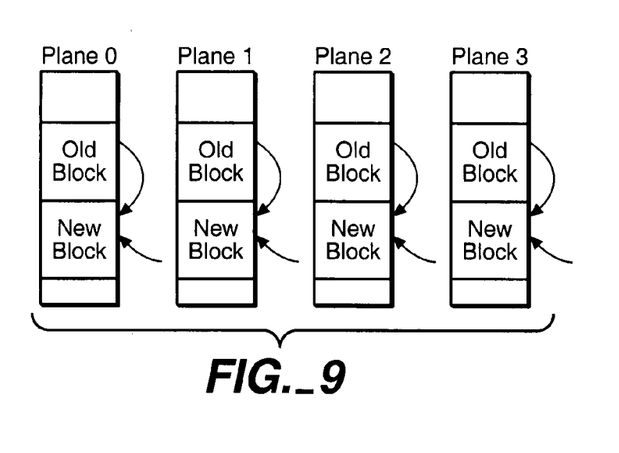
FIG. 9 shows a second example of modification of data within the memory cell array of FIG. 7.

FIG. 9 shows modification of data when using parallel mapping. To overwrite four consecutive sectors would require that four new blocks be found, the old and new data copied to the new blocks, and the four old blocks be erased. Four erasures need to occur. If many data consolidation operations are required relative to the number of host writes, as might occur under random or single sector access, the life of the chip will be affected by the increased number of erasures.

Each sector typically contains user data, ECC data, and overhead data. The overhead information may include sector ID, physical address information, and other system-related information required for data management. In one embodiment of this invention, the overhead information contains additional information required for managing the adaptive aspects of the data mapping. Some number of bits may be maintained to indicate the degree of parallelism, size of sub-metablock, sector interleave, or other indication of the data mapping.

As an example, if the maximum metablock size is four blocks, then a two-bit mapping field could be used to indicate the degree of parallelism, with 00b indicating by-one, 01b indicating by-two, and so on. In this scenario, a first block in a first plane would have a mapping field indicating the degree of parallelism it is formatted to, and based on that, some other number of blocks would be included in the same submetablock. For example, if the first value were 01b, indicating parallelism of degree two, it would indicate that only the next block in the metablock would be in the same submetablock.

This mapping field information would be maintained for convenience, as it is possible to determine the data mapping by reading the logical address information from a sector in each block in the metablock, or from sequential sectors in a given block, and determining the layout based on that. For example, if the first two physical sectors in a given block were two logical addresses away, the interleave factor would be two, and hence the degree of parallelism would be two. The data mapping information may be stored in separate tables, rather than in the sector overhead information, and updated each time the data mapping is modified for a given metablock or submetablock. The tables would be maintained in nonvolatile memory in one embodiment in a reserved area on the memory device.

Additionally, in an embodiment, statistics are maintained that track host usage and/or card activity for the purpose of later analysis to determine the optimal data mapping. One statistic is the number of sectors written in a given host command. If this statistic is stored along with each sector in a metablock or sub-metablock, the statistics may be analyzed as a group and a determination made as to the optimal degree of parallelism. In a specific embodiment, this statistic is stored in the sector overhead at the time the sector is written. In another embodiment the statistics may be stored temporarily in volatile memory, and then transferred to separate tables in volatile memory.

The statistics may also be accumulated for each sector or block written, for example into tables, such that the number of occurrences or relative number of occurrences of each is accumulated, and the degree of parallelism changed based on some threshold. For purposes of accumulation, the statistics would be binned to the closest parallelism allowed. For example, if only parallelism of degree one and four were permitted, a write command operating on three sectors would be accumulated in a count along with the host commands operating on four sectors, and any write commands on greater than four sectors would be binned in the count of operations on four sectors. The bin representing the greatest degree of parallelism is incremented by the command sector count divided by maximum parallelism.

As an example, if four is the maximum parallelism, then a host write of 16 sectors would increment the by-four count by four. If an area were predominantly written in single-sector host commands, the statistics would accumulate indicating that the optimal degree of parallelism is one. Likewise, if an area were predominantly written in four-sector host commands, the statistics would accumulate indicating that the optimal degree of parallelism is four.

Another statistic is whether a sector was written due to a host write or due to a data consolidation. Such statistics can be accumulated, for example in separate tables or in the overhead of the individual sectors, and based on some threshold of the relative number or ratio between the two mechanisms, such that the number of occurrences or relative number of occurrences of each is accumulated, and the degree of parallelism changed based on some threshold. For example, if it is determined that the sectors are predominantly written due to data consolidation, then overall performance or endurance may be improved if the area is reformatted for by-one parallelism to minimize the number of blocks involved in the data consolidation activity.

The two above-mentioned sets of statistics may be combined, such that reaching a threshold using the second statistic then causes an evaluation of the first statistic to determine the optimal degree of parallelism. The tables holding such accumulated statistics would be maintained in nonvolatile memory, in one embodiment in a reserved area on the memory device. Note that the accumulated statistics may not be maintained per sector, but rather on a metablock basis, or on a larger region, such as a grouping of metablocks.

The system may be optimized to maintain accumulated statistics on only areas of interest in order to conserve on space. For example, the maintenance of accumulated statistics for a given region could be initiated when a command operating on a different number of sectors than that for which the region was optimally formatted is detected. Such writes are referred to as nonoptimal write commands.

For example, if an area is formatted for by-one parallelism, and a four-sector write is performed in the area, then it could initiate the storing of accumulated statistics for that region. Once the number of nonoptimal write commands exceeds a threshold, the system would switch the degree of parallelism to which the area is formatted. The accumulated statistics could be implemented as counters that are incremented upon occurrence of one host sector count, and decremented upon occurrence of another. For example, if only by-one and by-four parallelism are permitted, a single counter could be incremented for every occurrence of single-sector writes, and decremented with every occurrence of four-sector writes. When a certain threshold is reached, the region data organization would be switched.

Another method of storing the block access mode information would be to store the mode bits for blocks in mapping sectors stored in the system area. Access statistics may also be stored in the system area.

Figure 10:
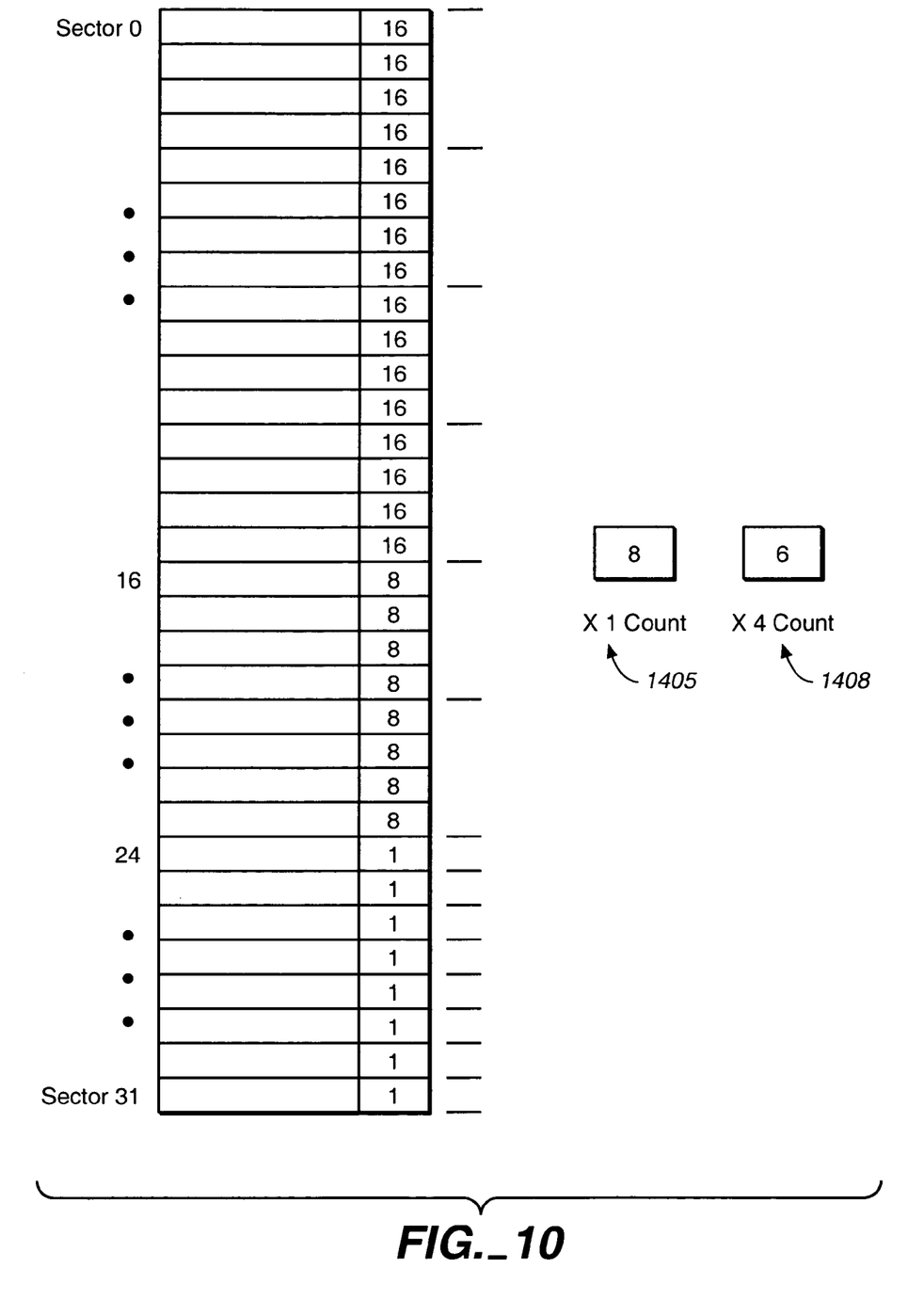
FIG. 10 shows an example of a count field within each data sector to track write operations by a host.

FIG. 10 shows an example of a count field within each sector of a block after the following sequence of write operations by a host:

(1) Host write of 16 sectors starting with sector 0;
(2) Host write of 8 sectors starting with sector 16;
(3) Host write of sector 24 (only 1 sector);
(4) Host write of sector 25;
(5) Host write of sector 26;
(6) Host write of sector 27;
(7) Host write of sector 28;
(8) Host write of sector 29;
(9) Host write of sector 30; and
(10) Host write of sector 31.

Also shown are the statistics gathered assuming that only degrees of parallelism of by-one (1405) and by-four (1408) are allowed. There are eight writes (1405) that can be made by single-sector writes. This statistic was gathered from the writes to sectors 24 to 31. There are six writes (1408) that can be made by by-four writes. More specifically, there was one sixteen sector write, which may be divided in four four-sector writes, and one eight sector write, which may be divided into two four-sector writes. This totals to six four-sector writes.

Based on the statistics gathered, the memory may be reformatted for by-one or by-four mapping. For example, the criteria on when to switch from one mapping to another mapping may be based on when a certain count (such as ×4) exceeds another count (×1). Other criteria may be used.

Also the example shows an example of gathering statistics for ×1 and ×4. However, in other embodiments, statistics may be tracked for other possible degrees of parallelism such as ×5, ×8, and ×16.

Figure 11:
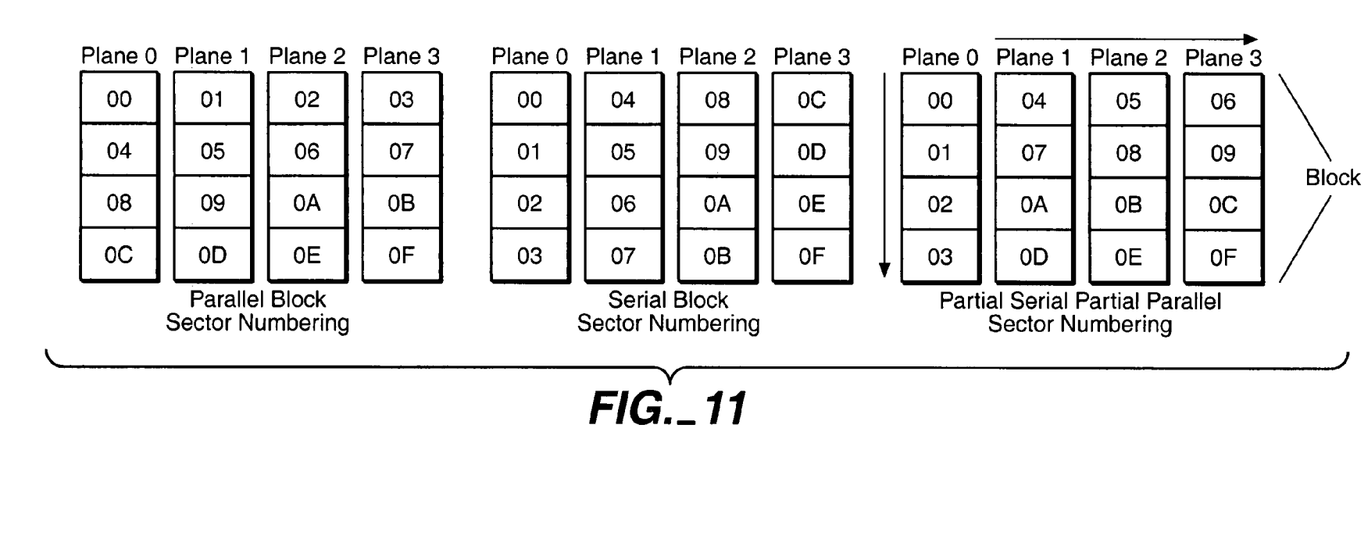
FIG. 11 illustrates examples of different ways to organize data sectors.

FIG. 11 shows examples of different types of sector mapping schemes. Knowledge about the access method used for each block, and in one embodiment the location of user data in each block is gained when the IDs of each block are read to initialize the conversion tables. The access mode bits are read from the header and written to the conversion table to indicate the access method of the block. Blocks do not need to be consecutive from plane to plane.

FIG. 11 shows examples of parallel block sector numbering scheme, a by-one or serial block sector numbering scheme, and a partial by-one access and partial greater than by-one parallel sector numbering scheme. The partial by-one and partial greater than by-one sector numbering scheme may be referred to as a mixed mode scheme. These are used with parallel, sequential (by-one), and mixed mode access methods, respectively.

Figure 12:
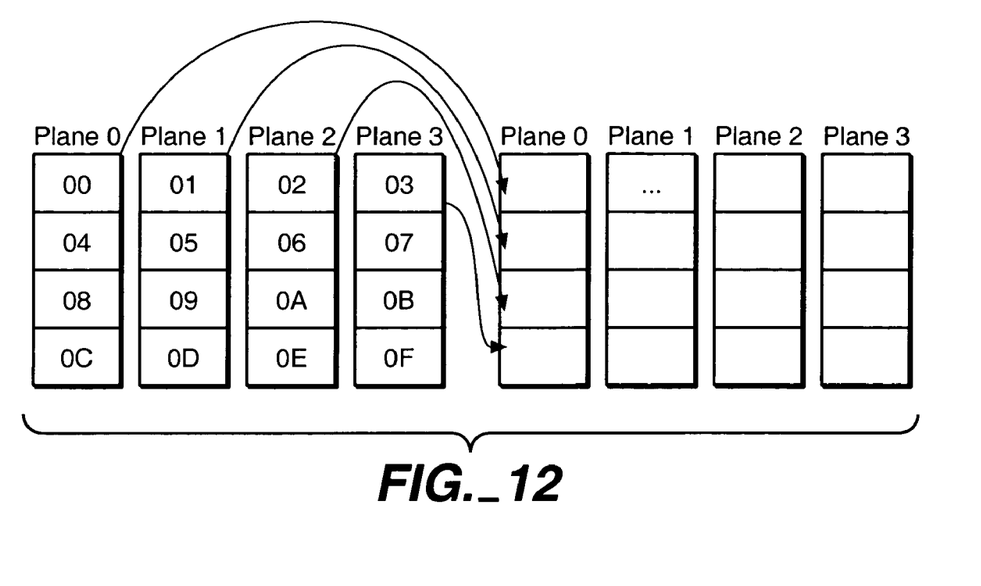
FIG. 12 shows an example of a conversion of memory cell array blocks from a first sequence to a second sequence.

FIG. 12 shows an example of a 4×-to-1× mapping conversion. This is a conversion from a 4× mapping to a 1× mapping. During normal operation, a Flash memory is typically initially set up to run at the highest performance, which means in parallel mode (greater than by-one access). In general, the occasion of an allocation of an update block will be used as a trigger to determine if the metablock should be converted from one format to another. If the number of single sector writes in a block exceeds a threshold (which may be user defined or defined by the designer of the system), then the access method is converted to the by-one method. This requires all of the sectors to be written into new blocks into their appropriate positions, and their access bits set accordingly.

Figure 13:
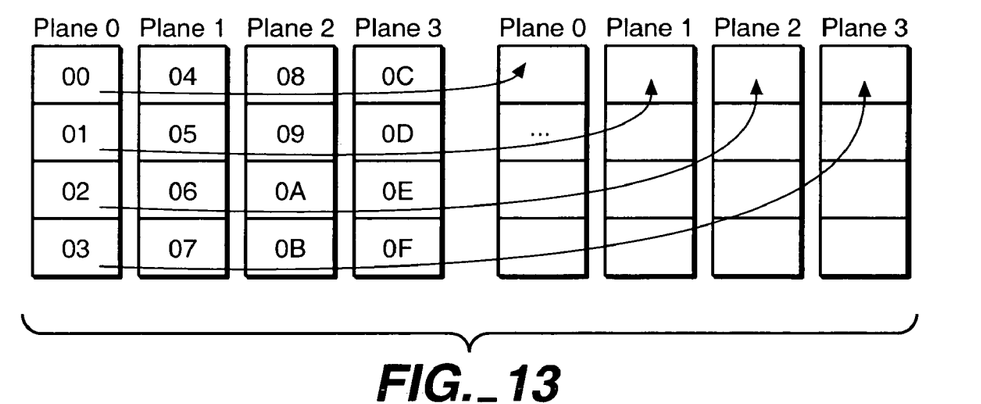
FIG. 13 shows an example of a conversion of memory cell array blocks from the second sequence to the first sequence.

FIG. 13 shows an example of sequential to parallel mapping conversion. Conversely to the previous case, if the sectors in a block go from single sector accesses to multisector accesses, the access method is converted accordingly to parallel access, the sectors are rewritten into new blocks accordingly, and the access mode bits in each sector are adjusted. A change from a first degree of parallelism mapping to second degree of parallelism mapping would be performed in a similar way. For example, the mapping may be converted from 2× to 4× or from 4× to 8×, or vice versa. The first degree of parallelism in FIG. 13 is a 1× mapping. This is a conversion from a 1× mapping to a 4× mapping.

It should be noted that the system would generally tie the change from one format to another with the allocation of a new block as when data is being written from the host to a sector that already has data written to it. A new metablock or sub-metablock is allocated when host rewrites data in a given area. At such a time, some of the data residing in the original area may be copied to the newly allocated area. Sometimes it is copied later during a data consolidation. Whatever the case may be, the system would generally take advantage of the event of allocating a new area for the logical block to transition the format. At such a time, the usage log for the area may be reset.

The controller has the ability to switch between each access mode as necessary. The controller can determine which mode to use based on the host activity. If a number of single sector accesses have occurred, this may trigger the conversion from the parallel access mode to the sequential access mode.

Furthermore, mixed mode block accesses are also allowed. Within the same memory integrated circuit, some data may be stored for sequential access and other data may be stored for parallel access. Furthermore, within the same Flash card system, one memory integrated circuit may have data stored for sequential access while other data stored on another memory integrated circuit is stored for parallel access.

CONCLUSION

Although the various aspects of the present invention have been described with respect to exemplary embodiments thereof, it will be understood that the present invention is entitled to protection within the full scope of the appended claims.

The invention claimed is:

1. In a memory system having non-volatile memory cells arranged in blocks as a unit of erase, pages therein as a unit of data programming and reading, and planes of a plurality of blocks that are independently accessible, a method of operation of the memory system, comprising:

logically forming metablocks that individually include blocks from a plurality of the planes, sequentially receiving write commands with a varying number of units of data and logical addresses of the individual units of data, determining from the write commands whether (1) a given one or more units of data having consecutive logical addresses are being received or (2) more than said given number of one or more units of data having consecutive logical addresses are being received, and writing all the data received with individual write commands by (1), in response to determining that the given one or more units of data having consecutive logical addresses are being received, writing the given one or more units of data into at least one page within at least one of the blocks of only one of the planes, and (2), in response to determining that more than said given number of one or more units of data having consecutive logical addresses are being received, writing the more than said given number of units of data in parallel into pages within two or more blocks of one of the metablocks in two or more planes.

2. The method of claim 1, additionally comprising writing an indication into non-volatile memory cells at the same time as the received data that identifies the blocks into which the data are being written in parallel.

3. In a memory system having a plurality of non-volatile memory cells arranged in a plurality of blocks of memory cells as a unit of erase that are provided in a plurality of independently accessible sub-arrays and multiple pages within individual blocks as units of data programming and reading, a method of operation of the memory system, comprising:

logically forming metablocks that individually include blocks from a plurality of the sub-arrays, sequentially receiving individual write commands with a number of sectors of data to be written into either a signal page or into a plurality of pages, in response to receiving the write commands with a number of sectors of data for a plurality of pages, writing all the received data in parallel into pages within a plurality of blocks of at least one of the metablocks in a plurality of the sub-array, in response to receiving the write commands with a number of one or more sectors of data for only a single page of data writing all the received data in parallel into individual pages of individual blocks of only one of the sub-arrays, and maintaining indications in the non-volatile memory cells that are associated with the written sectors of data when the individual sectors have been written into pages within a plurality of blocks of at least one of the metablocks in a plurality of the sub-arrays, and when the individual sectors have been written into individual pages of individual blocks of only one of the sub-arrays.

4. The method of claim 3, wherein a file allocation table (FAT) is stored within the non-volatile memory cells and the sectors of data for a single page of data include data of the FAT.

5. The method of claim 3, additionally comprising storing the indications with their respective sectors of data as part of headers thereto.

* * * * *

UNITED STATES PATENT AND TRADEMARK OFFICE
CERTIFICATE OF CORRECTION

| | | |
|---|---|---|
| PATENT NO. | : 7,631,138 B2 | Page 1 of 1 |
| APPLICATION NO. | : 10/750190 | |
| DATED | : December 8, 2009 | |
| INVENTOR(S) | : Gonzalez et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 572 days.

Signed and Sealed this

Second Day of November, 2010

David J. Kappos
*Director of the United States Patent and Trademark Office*